(12) United States Patent
Merritt

(10) Patent No.: US 10,512,998 B1
(45) Date of Patent: Dec. 24, 2019

(54) MACHINING SYSTEM AND METHOD

(71) Applicant: James R. Merritt, Lexington, NC (US)

(72) Inventor: James R. Merritt, Lexington, NC (US)

(*) Notice: Subject to any disclaimer, the term of this patent is extended or adjusted under 35 U.S.C. 154(b) by 0 days.

(21) Appl. No.: 15/980,172

(22) Filed: May 15, 2018

(51) Int. Cl.
*B23Q 11/00* (2006.01)
*B23Q 3/154* (2006.01)
*B23C 9/00* (2006.01)

(52) U.S. Cl.
CPC ............ *B23Q 11/0064* (2013.01); *B23C 9/00* (2013.01); *B23C 2230/00* (2013.01); *B23C 2260/00* (2013.01); *B23Q 3/154* (2013.01)

(58) Field of Classification Search
CPC ........ B23Q 3/06; B23Q 3/154; B23Q 3/1546; B23Q 3/1543; B23B 31/28; B23B 11/002; B25B 11/00
USPC ..... 269/8, 9, 55, 58; 409/135, 225, 136, 219
See application file for complete search history.

(56) References Cited

U.S. PATENT DOCUMENTS

| | | | | |
|---|---|---|---|---|
| 687,931 | A * | 12/1901 | Barr ...................... | B23Q 3/1543 192/84.1 |
| 2,474,800 | A * | 6/1949 | Nill ........................ | B23Q 3/154 335/285 |
| 3,854,711 | A * | 12/1974 | Dong ..................... | B23Q 3/154 269/8 |
| 4,777,463 | A * | 10/1988 | Cory ..................... | B23Q 3/1546 335/286 |
| 4,837,540 | A * | 6/1989 | Michele ................. | B23Q 3/154 335/286 |
| 7,999,645 | B2 * | 8/2011 | Sarda .................... | B25B 11/002 269/85 |
| 8,905,387 | B2 | 12/2014 | Wang | |
| 8,967,603 | B2 * | 3/2015 | Innocente ............ | B23Q 3/1546 269/289 R |

FOREIGN PATENT DOCUMENTS

| | | | | |
|---|---|---|---|---|
| EP | 2497599 | A1 * | 9/2012 | ............. B23Q 3/154 |
| WO | WO-2007119245 | A1 * | 10/2007 | ........... B23Q 3/1543 |
| WO | WO-2010070683 | A1 * | 6/2010 | ........... B23Q 3/1543 |

* cited by examiner

*Primary Examiner* — Nicole N Ramos
(74) *Attorney, Agent, or Firm* — Tuggle Duggins P.A.; Blake P. Hurt

(57) ABSTRACT

An improved machining system for use in a CNC mill for the production of thin, hardened metal implement such as bed knifes includes a laminate mounting substrate with holes for receiving a pair of locator pins therein, at least one of the locator pins configured to displace longitudinally relative to the mounting substrate but not laterally which allows the system to accommodate a wide variety of metal implements. The system also includes magnetic cladding to protect the metal implement from metal chips being attracted by a magnetic element positioned beneath the mounting substrate to the finished product, allowing for higher quality cutting heads in the mill and a more efficient production of finished implements. A method of forming such implements is also provided.

27 Claims, 3 Drawing Sheets

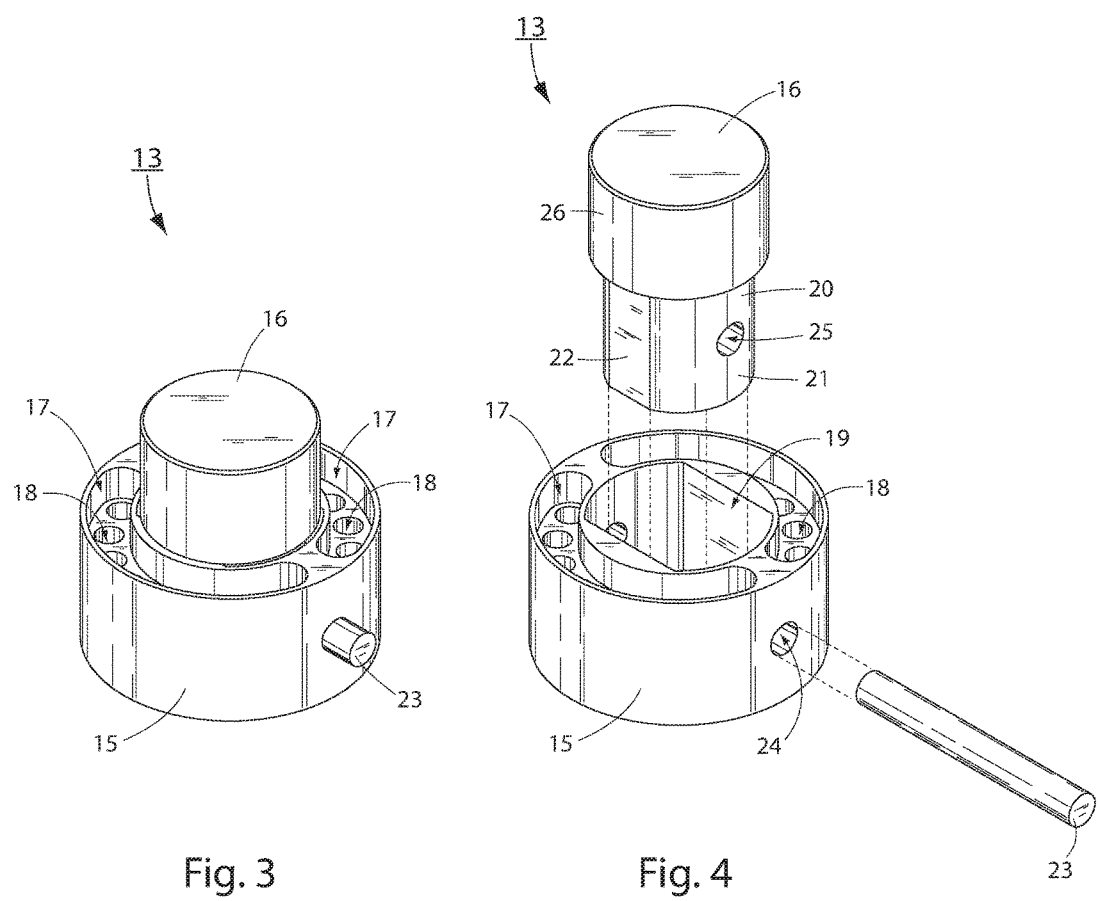

US 10,512,998 B1

MACHINING SYSTEM AND METHOD

FIELD OF THE INVENTION

The invention herein pertains to a machining system and method, and particularly pertains to a system and method utilizing a magnetic element to adhere a thin metal implement to a substrate with one or more locating pins that combine to prevent inadvertent displacement of the implement during machining while also permitting the removal of metallic chips from the finished implement.

DESCRIPTION OF THE PRIOR ART AND OBJECTIVES OF THE INVENTION

The use of Computer Numerical Control (CNC) in machining is a process using computational devices to control machine tools such as lathes, mills, routers, grinders, and the like. In the conventional setting, a set of instructions is programmed into the computational device to instruct the tool to orient and operate in space. One of the greatest challenges in machining parts in this manner is maintaining the implement being acted upon in the anticipated position so the programmed coordinates accurately and repeatedly produce the desired part. For example, machining a metal implement in a CNC mill requires the movement of a cutting head about the metal part across or along one or more planes. It may be desirous to produce a metal implement in this manner, but there are several technical hurdles to overcome. For starters, the amount of rotational pressure or torque imparted on an implement during CNC milling can be significant, as the revolutions per minute (RPM) of the milling bit are very high. Contacting the metal implement with this rotating impetus inherently causes inadvertent displacement of said implement, resulting in inaccurate milling. Further, and in contrast to a procedure such as grinding which is considered a "finishing" process due to the fact that it only removes a small amount of the implement surface material (for example a thousandths [$1/1000^{th}$] of an inch or less), CNC mill machining is a cutting process, capable of great accuracy but intended to remove much more (up to an eighth [$1/8^{th}$] of an inch) of the metal implement surface material. This combination of inward and rotational force repeatedly impacting the metal implement over time has historically made it all but impossible to maintain the implement in the predetermined position necessary to utilize CNC machinery with any degree of accuracy. As if this weren't enough, the matter is further complicated by the result of the milling process itself. In view of the impact and rotation described above, small metallic remnants result from the machining process, often at near-molten temperatures as the mill processes a metal implement. A large number of these "chips" as they are sometimes called (despite defining a variety of sizes and shapes) fall away from the implement due to gravity. However, access to the implement during milling is at a premium, particularly with the advent of movable mounts that can orient the implement about x, y, and z axes in space. Mechanical clamps are simply not feasible on a commercial scale, but magnetic mounts can secure the metal implement in place while offering the requisite space to permit the mill bit to access the implement being machined. That said, mounts that can maintain the implement in place during milling also attract the metal chips, adhering them to either the implement or the magnet itself. This is an even greater problem when milling thin metal implements from harden steel, for example bed knives, due to the relative light weight of the implement to be formed, necessitating a stronger magnet than would otherwise be sufficient for the purpose. Therefore, there remains a need to affix a metal implement in a reproducible orientation during milling without attracting remnants that renders the implement inoperable.

Thus, in view of the problems and disadvantages associated with prior art devices, the present invention was conceived and one of its objectives is to provide an improved machining system that can reproducibly orient a thin metal implement in space and maintain it within a predetermined tolerance range during machining with a CNC mill.

It is another objective of the present invention to provide an improved machining system with a plurality of locator pins for positioning the thin metal implement during machining.

It is still another objective of the present invention to provide an improved machining system with at least one locator pin that is adjustable or displaceable in the longitudinal direction relative to a major axis defined by the mounting surface.

It is yet another objective of the present invention to provide an improved machining system with a magnetic element and a mounting surface or substrate, the mounting surface defining a predetermined position and orientation of alternating magnetic poles configured to releasably adhere a thin metal implement to the mounting substrate.

It is a further objective of the present invention to provide an improved machining system including a magnetic cladding positioned on the mounting surface of sufficient strength such that when the thin metal implement is in the process of being machined, the metallic chips are either urged away from the implement or can be removed therefrom with a simple blast of air.

It is still a further objective of the present invention to provide an improved machining system that can mill a thin hardened metal implement in less than 10 minutes.

It is yet a further objective of the present invention to provide an improved machining system that can utilize one or more ceramic bits in a mill cutting head without use of liquid coolant.

It is another objective of the present invention to provide an improved method of forming a thin metal implement by providing a mounting surface with at least one pair of longitudinally opposing locator pins secured to a mounting substrate, at least one of the locator pins displaceable in the longitudinal direction relative to a major axis defined by the mounting surface but not displaceable in the lateral direction, the mounting surface including a magnetic cladding to disrupt the magnetic field of a magnetic element positioned proximate the mounting surface so that metallic chips resulting from the machining process of a CNC mill can be removed from the thin metal implement without need of liquid coolant.

Various other objectives and advantages of the present invention will become apparent to those skilled in the art as a more detailed description is set forth below.

SUMMARY OF THE INVENTION

The aforesaid and other objectives are realized by providing an improved machining system for production of thin, hardened metal implements in a CNC mill running high performance cutting heads without the need for liquid coolant, the system including a mounting substrate defining several magnetic poles in close proximity to a magnetic element with a strength of about 5,000 kilogram-force (kgf) (+/−5%). The mounting surface is a metallic laminate formed from alternating bands of soft, low-carbon steel and brass in a 2 millimeter by 4 millimeter or 2 millimeter by 6 millimeter pattern that are affixed together. At least one pair of locator pins are attached to the mounting surface and positioned in longitudinally opposing orientation relative to the mounting surface. The first pin is static but the opposing pin is configured for longitudinal displacement to accommodate a variety of thin metal implements to be machined while simultaneously resistant to lateral displacement These locator pins are formed from very hard steel to combat wear and are robustly fastened to the mounting surface. The exterior edge or corner proximate the thin metal implement includes a magnetic cladding formed from aluminum is disrupt the magnetic field produced by the magnet element during machining so the metallic chips resulting from the machining process of a CNC mill can be removed from the thin metal implement without need of liquid coolant. This system can mill a thin hardened metal implement in less than 10 minutes with a tolerance variance of four thousandths ($4/1000^{th}$) of an inch or less between machined implements.

An improved method of forming a thin metal implement is also disclosed herein and includes the steps of providing a mounting surface with at least one pair of longitudinally opposing locator pins secured to a mounting substrate, at least one of the locator pins displaceable in the longitudinal direction relative to a major axis defined by the mounting surface but not displaceable in the lateral direction, the mounting surface including a magnetic cladding to disrupt the magnetic field of a magnetic element positioned proximate the mounting surface, disposing the system within a CNC mill with a ceramic cutting head, and machining a thin, metal, hardened implement in 10 minutes or less while also preventing metallic remnants from adhering to the metal implement, which can be removed with a blast of air instead of a liquid coolant.

BRIEF DESCRIPTION OF THE DRAWINGS

FIG. 3 depicts an elevated perspective view of a movable locator pin assembled, for use in the improved machining system of FIG. 1; and FIG. 4 illustrates an elevated perspective view of a moveable locator pin exploded, for use in the improved machining system of FIG. 1.

DETAILED DESCRIPTION OF THE PREFERRED EMBODIMENT AND OPERATION OF THE INVENTION

Figure 1:
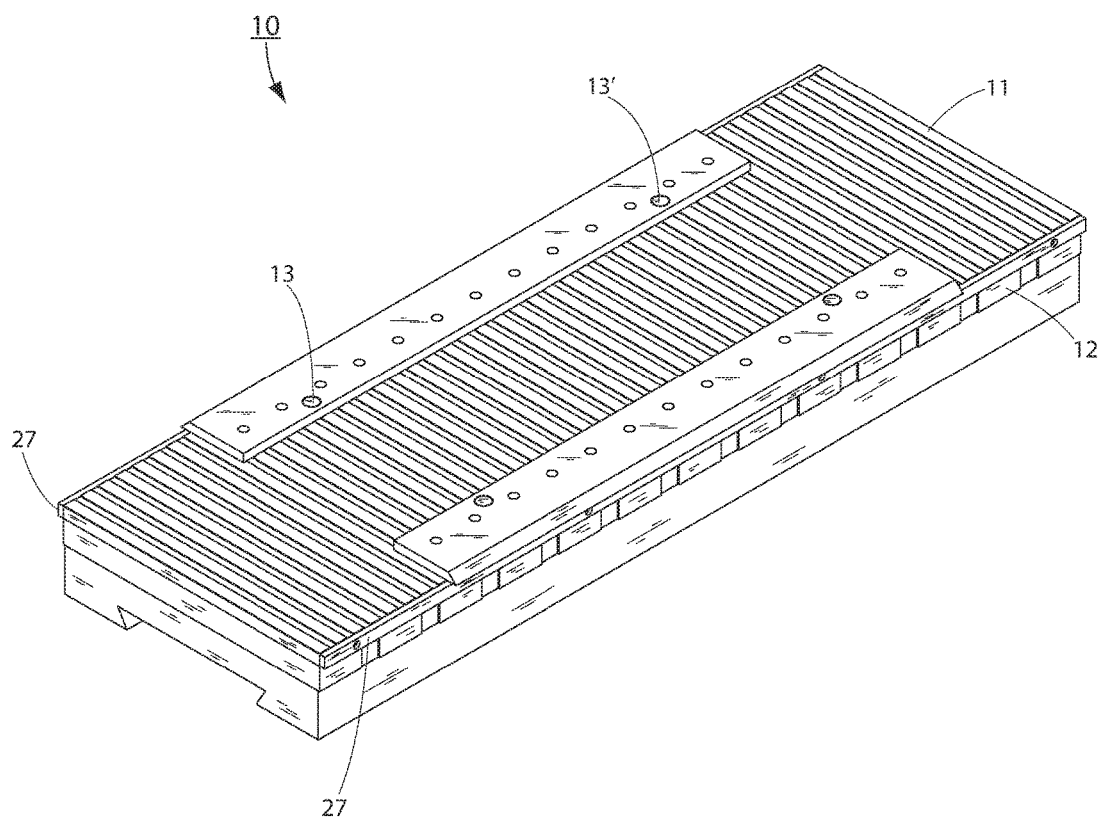
FIG. 1 shows an elevated perspective view of the improved machining system disclosed herein.
Figure 2:
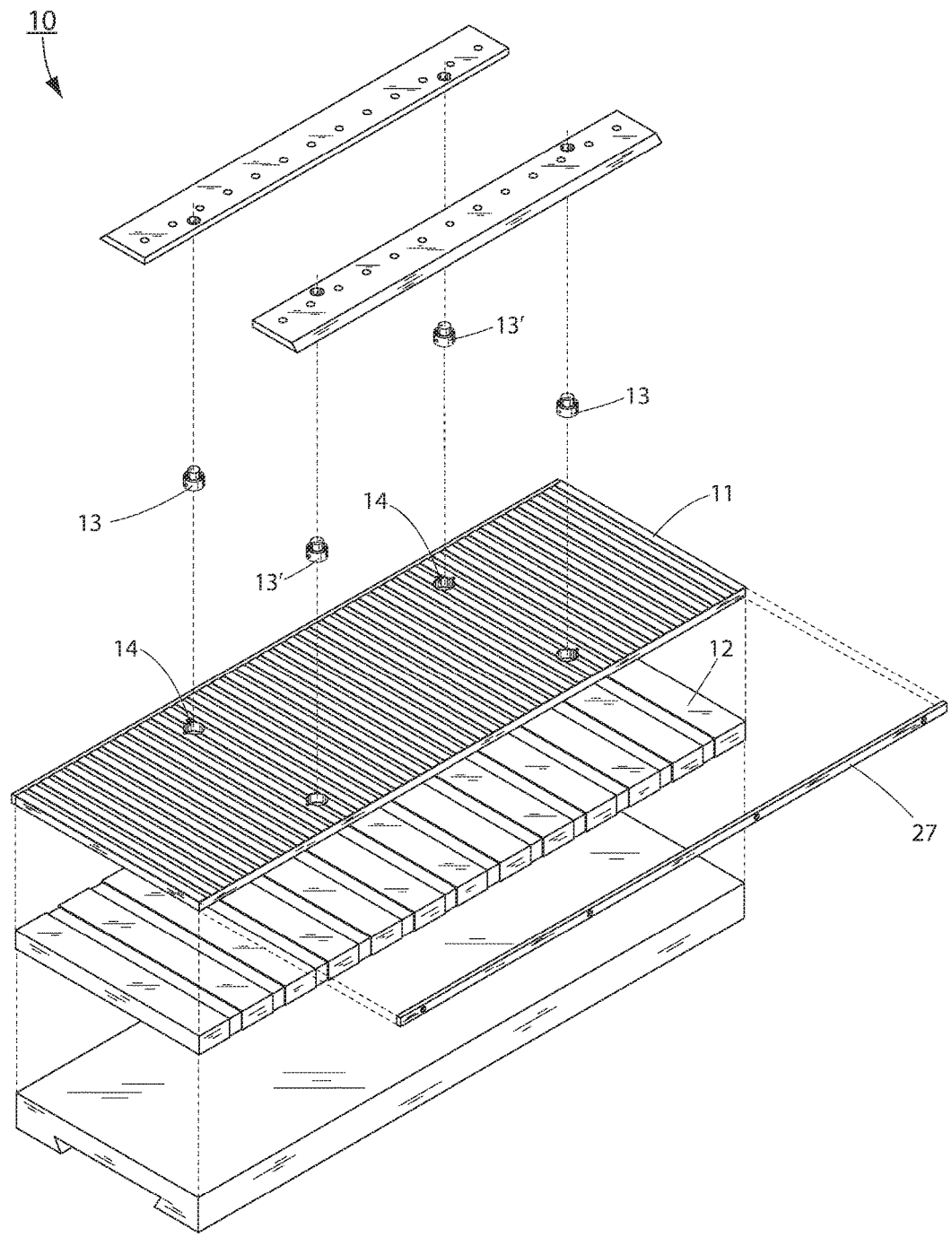
FIG. 2 pictures an elevated perspective view of the exploded components of the improved machining system of FIG. 1.

For a better understanding of the invention and its operation, turning now to the drawings, FIGS. 1 and 2 illustrate assembled and exploded views of preferred machining system 10 including mounting surface 11 proximate magnetic element 12 and including locator pins 13, 13'. As would be understood, machining system 10 as described herein would preferably be positioned within a CNC milling machine (the entire assembly may be referred to as a "table") although it should be understood that the system may also be deployed in lathes, routers, grinders, or any other fabrication device that may benefit from a securely held implement.

The preferred embodiment of mounting surface 11 is defined as a laminate member. In an embodiment of this laminate member, two or more materials are attached, affixed, or otherwise connected together to form mounting surface 11. While connection methods such as mechanical, chemical, or adhesive attachment methods are within the scope of the instant disclosure, the preferred method of attachment is to brazen the respective portions of the laminate member together. In one preferred embodiment of the laminate member, an alternative pattern is defined by at least two separate materials. In one preferred embodiment, the two materials are each species of metal. In a further embodiment, the materials are defined as a low-carbon steel and brass. Low-carbon steel (i.e. less than 0.5% C by weight) is desirable to transmit the magnetic field (or flux) from the magnet below to the implement being machined above. One preferred species of low-carbon steel is known as 1018 steel as named by the North American Steel Grade System. These materials are preferably soldered or brazened together in a repeating pattern for consistent transmission of the magnetic field, ideally along the entire length of the implement being machined. In one embodiment, the pattern is two millimeters of brass and four millimeters of steel. In a different embodiment, the pattern is two millimeters of brass and six millimeters of steel. The pattern is not intended to be a limiting factor of the instant disclosure, but it should be noted that the more steel that is incorporated into the laminate, the stronger the adherence imparted on the implemented being machined will be. This is crucial in the machining of thin, flat metal implements formed from hardened steel, for example a bed knife, to secure substantially the entire length of the implement to prevent inadvertent displacement of the implement during milling.

Although not illustrated, alternate embodiments of mounting substrate 11 are also considered within the scope of the instant disclosure. By way of example, and not intending to be a limitation, an embodiment of mounting substrate 11 may be defined as a top plate structure instead of a laminate member. In this embodiment, the top plate is defined substantially by a single metallic material with comparatively small portions interspersed with less or non-magnetic materials such as polymeric resins or the like. The metallic material and resin material may form any of a number of repeating and/or geometric shapes, but this embodiment of mounting substrate defines significantly fewer alternating magnetic poles compared to the preferred embodiment of mounting substrate described above relative to the length of the substrate.

As illustrated in FIGS. 1 and 2, preferred mounting substrate 11 includes two or more apertures 14 defined therein that are sized and shaped to receive locator pins 13, 13' within said apertures 14. Apertures 14 may be milled with great caution to ensure that mounting substrate 11 does not delaminate during the formation of the apertures. The shape of apertures 14 is not intended to be construed as a limitation, but as will be described in further detail below, the geometry of apertures 14 is defined to match that of locator pins 13, 13'. In the preferred embodiment of mounting substrate 11, two pairs of oppositely oriented apertures 14 are formed in mounting substrate 11, permitting the machining of more than one metal implement within the CNC mill, increasing the efficiency and output of a given machine.

Locator pin 13' is a static mounting support member, and once positioned within mounting substrate 11 is not intended to move at all during the machining of a thin metal implement within the CNC mill. By contrast, FIGS. 3 and 4 illustrate locator pin 13 is a dynamic component, configured to displace longitudinally relative to mounting substrate 11 to accommodate a wider range of thin metal implements to be machined. In the case of both preferred locator pins 13 and 13', collar 15 serves as the primary structural interface between mounting substrate 11 and pin 16. Although not illustrated for the sake of brevity, unless indicated otherwise, the structures associated with locator pin 13' are similar in all respects to those described herein pertaining to locator pin 13. Both locator pins 13, 13' are preferably formed from a structural robust material due to the operating environment in which they engage. In the preferred embodiment, a Class "C" metal on the Rockwell scale forms locator pins 13, 13', it is more preferred if a metal measuring at least 65 HRC, and the most preferred material defines an HRC of about 68. In one preferred embodiment, locator pins 13, 13' are formed out of a metal material sold commercially under the name CRUCIBLE 15™. Collar 15 is preferably a cylindrical member with an outer wall that defines a height greater than its thickness. The outer wall is smooth and substantially free from any protrusions or projections, providing an uninterrupted surface with which to frictionally contact the corresponding wall of mounting substrate 11 defining aperture 14. One or more recesses 17 may be defined in the top surface of collar 15. In the preferred embodiment, a pair of arcuate recesses 17 uniformly track the general circumference defined by the cylindrical shape of collar 15. On the floor of each recess, a plurality of holes 18 are preferably defined therein. Although not depicted, these holes 18 pass through the entirety of collar 15 and open on a bottom surface thereof. Holes 18 are sized and shaped to receive a mechanical fastener therein, because while locator pins 13, 13' may be press-fit into apertures 14, it may be preferable for structural security to secure said pins 13, 13' to mounting substrate 11. While a wide range of mechanical, chemical, and adhesive fasteners are known in the art, the preferred embodiment of fastener are two, 2-56 style screws (not shown) defining a sufficient length to pass through the width of collar 15 and gain sufficient purchase in the steel sections of mounting substrate 11 to resist displacement during machining of metal implements.

The primary difference between locator pins 13 and 13' is the size and shape of bore 19 defined within collar 15 and the corresponding geometry of pin body 20. In the case of locator pin 13', the size and shape of the pin body substantially match that of the collar bore (at an increased size tolerance of 1 or 2/1000ths of an inch). In one non-limiting example, the bore defines a circle and the geometry of the corresponding pin body defines a substantially similar circle larger only by 1/2/1000ths, preventing displacement in both the lateral and longitudinal direction. By comparison, bore 19 defined within collar 15 of locator pin 13 defines a shape with linear longitudinal sides (or side walls) and arcuate lateral sides (or ends). The corresponding geometry defined by pin body 20 defines substantially identically arcuate ends 21 connected by a pair of planar (i.e. not arcuate) flats 22 (only one of the ends 21 and flats 22 are demonstrated in FIG. 4, but it should be understood that the opposing end/side is a mirror image of the end/side illustrated). However, the length of the flats 22 is shorter than the corresponding linear wall sections of collar 15, permitting pin 16 to slide along rod 23 that passes through openings 24 formed in the exterior walls of collar 15 and apertures 25 defined in pin body 20. In the preferred embodiment, the matching arch geometries shared by the arcuate ends 21 of pin 16 and bore 19, coupled with the use of comparatively hard materials in the formation of pin 16 and collar 15, locator pin 13 is able to withstand immense and repeated force impetuses imparted by a commercial grade CNC mill without experiencing practically any lateral displacement while simultaneously permitting longitudinal displacement to accommodate a wide arrange of metal implements to be machined. In an embodiment, oversized pin head 26 relative to bore 19 ensures that the maximum surface area is available to frictionally engage with the thin metal implement being machined.

The preferred embodiment of mounting substrate 11 may further include cladding 27 to disrupt the magnetic field generated by magnetic element 12 positioned proximate and below, and more preferably adjacent to, mounting substrate 11. Numerous varieties of magnetic elements are known in the art, and it is conceivable that several different configurations of magnet may serve the purpose of magnetic element 12 (single element or multiple elements, different sizes and shapes of elements, etc.). However, in order to serve the purpose of magnetic element 12 in machining system 10, the magnet preferably exerts sufficient force to hold a thin, flat, hardened metal object weighing less than 5 pounds without significant displacement (less than 5/1000ths of an inch displacement in any direction, and preferably no more than 3/4/1000ths of an inch displacement in any direction) during machining in a CNC milling machine with a high-performance cutting head. In this context, a high performance cutting head is one that can produce a machined metal implement formed from hardened metal with a "strike point" on the implement at least as fine (i.e. sharp and substantially clear of imperfections on the implement surface) as a that achieved via grinding. However, the solution cannot be to simply select the most powerful magnet available or affordable, since the magnetic field produced by such a powerful magnet could (and would) overcome any protective cladding and adhere metal fragments produced during milling to the surface of the metal implement being machined, effectively rendering inoperable the very product being manufactured. Therefore, preferred magnetic element 12 defines a strength of at least 4,000 kilogram-force (kgf) but less than approximately 6,000 kgf, and most preferably about 5,000 kgf (+/−5%). This magnetic force is strong enough to hold the metal implement in place during machining, but not so strong as to overcome the protective cladding and ruin the part being manufactured. Therefore, the preferred material forming cladding 27 is a non-ferrous material that sufficiently disrupts the magnetic field caused by magnetic element 12 to the degree necessary to remove metal chips or shavings from the implement being machined with an air blast measuring 50 psi or less. In one embodiment, cladding 27 is defined as a one inch by one inch strip of aluminum. In an alternate embodiment, cladding 27 is defined by an aluminum strip with a thickness of less than one inch. In another alternate embodiment, the material of cladding 27 is defined as stainless steel. In further embodiments, cladding 27 is formed out of wood or plastic.

An improved method of forming a thin metal implement via a CNC mill and a high-performance cutting head is also disclosed herein. The method includes providing a mounting surface 11 with at least one pair of longitudinally opposing locator pins 13, 13' secured to the mounting substrate. In an embodiment, mounting surface 11 is defined as a laminate structure formed from at least a first material and a second material, the first material different than the second material, and in the preferred embodiment the first material is defined as low-carbon steel and the second material is defined as brass. In an alternate embodiment, mounting surface 11 is defined as a top plate structure, formed substantially from a first material with the inclusion of a second material, and in one such embodiment the first material is defined as steel and the second material is defined as a polymeric resin. One of locator pins 13 is displaceable in the longitudinal direction relative to a major axis defined by the mounting surface 11 but not displaceable in the lateral direction, such that the mounting surface can accommodate a wide variety of thin metal implements to be milled. The mounting surface 11 may include a magnetic cladding 27 to disrupt the magnetic field of a magnetic element 12 positioned proximate, preferably beneath and adjacent to, the mounting surface 11 so that metallic chips resulting from the machining process of a CNC mill can be removed from the thin metal implement without need of liquid coolant. The aversion to liquid coolant is important, as the use of high-performance cutting heads formed out of materials such as ceramic is desirable to achieve the various manufacturing metrics disclosed herein, but the use of liquid coolant may incur a "heat shock" impetus on the cutting head members (not shown), which can disrupt the accurate milling of thin metal implements, particularly those that are made from hardened metal materials. This can also cause the cutting head to fail far more prematurely than otherwise, greatly hampering efficiency and increasing cost. The method may further include selecting a metal implement stock made from a hardened metallic material, for example NS801 steel, attaching the metal implement to the locator pins 13, 13', and magnetically fastening the metal implement to the mounting surface 11 via the magnetic element 12. Unlike grinding, a process that removes 0.001-0.002 inches of material in a given cut and can take 45 minutes to produce a single part, a CNC mill with the confidence of positioning of the metal implement can easily remove 0.03-0.04 inches of material in a cut, resulting in a method that produces a finished thin metal implement formed from hardened metal, such as a bed knife, in less than 10 minutes, and preferably in 4-8 minutes.

The illustrations and examples provided herein are for explanatory purposes and are not intended to limit the scope of the appended claims.

I claim:

1. An improved machining system comprising,
    a magnetic element positioned proximate to a mounting substrate,
    the mounting substrate defining a plurality of apertures therein,
        at least one locator pin configured to displace longitudinally relative to the mounting substrate, the at least one locator pin defined by a collar and a pin, the collar further defining a plurality of holes sized and shaped to receive a fastener therein,
    wherein the mounting substrate is configured to secure a thin metal implement via the magnetic element and the at least one locator pin during implement formation.

2. The improved machining system of claim 1, wherein the mounting substrate is defined as a laminate structure.

3. The improved machining system of claim 1, wherein the mounting substrate is formed from a first material and a second material, the first material different from the second material.

4. The improved machining system of claim 3, wherein the first material is defined as a low-carbon steel and the second material is defined as a brass.

5. The improved machining system of claim 1, further comprising a magnetic cladding carried by the mounting substrate.

6. The improved machining system of claim 5, wherein the magnetic cladding is defined as an aluminum material.

7. The improved machining system of claim 5, wherein the magnetic cladding is defined as a stainless steel material.

8. The improved machining system of claim 1 further comprising an arcuate recess formed in a top surface of the collar, wherein the plurality of holes are positioned within the arcuate recess.

9. The improved machining system of claim 1, wherein the collar defines a bore with linear sides and arcuate ends, and wherein the pin defines a pin body with planar flats and arcuate ends.

10. The improved machining system of claim 9, wherein the bore arcuate ends and the pin body arcuate ends are substantially the same.

11. The improved machining system of claim 10, wherein a length of the bore linear sides is greater than a length of the pin body flats, producing displacement of the pin body within the bore.

12. A method of manufacturing a metal implement comprising the steps of;
    providing a magnetic element positioned proximate to a mounting substrate, the mounting substrate defined as a laminate structure formed from a first material and a second material, the first material different from the second material and defining a plurality of apertures therein, and at least one locator pin configured to displace longitudinally relative to the mounting substrate positioned within one of the plurality of apertures but not displacing laterally relative to the mounting substrate,
    securing the metal implement to the mounting substrate via the at least one locator pin and magnetic element, and
    machining the metal implement for less than 10 minutes to produce a final product without use of a liquid coolant to remove any metallic chips.

13. The method of claim 12, further comprising a magnetic cladding carried by the mounting substrate.

14. The method of claim 13, wherein the magnetic cladding is defined as aluminum.

15. The method of claim 12, wherein the at least one locator pin is formed from a Class "C" metal on the Rockwell scale.

16. The method of claim 12, wherein the magnetic element defines a strength of about 5,000 kgf (+/−5%).

17. An improved machining system comprising,
    a magnetic element positioned proximate to a mounting substrate,
    the mounting substrate defining a plurality of apertures therein,
        at least one locator pin configured to displace longitudinally relative to the mounting substrate, the at least one locator pin defined by a collar and a pin, the collar further defining a bore with linear sides and arcuate ends and the pin further defining a pin body with planar flats and arcuate ends,
    wherein the mounting substrate is configured to secure a thin metal implement via the magnetic element and the at least one locator pin during implement formation.

18. The improved machining system of claim 17, wherein the mounting substrate is defined as a laminate structure.

19. The improved machining system of claim 17, wherein the mounting substrate is formed from a first material and a second material, the first material different from the second material.

20. The improved machining system of claim 19, wherein the first material is defined as a low-carbon steel and the second material is defined as a brass.

21. The improved machining system of claim 17, further comprising a magnetic cladding carried by the mounting substrate.

22. The improved machining system of claim 21, wherein the magnetic cladding is defined as an aluminum material.

23. The improved machining system of claim 21, wherein the magnetic cladding is defined as a stainless steel material.

24. The improved machining system of claim 17, wherein the collar defines a plurality of holes sized and shaped to receive a fastener therein.

25. The improved machining system of claim 24 further comprising an arcuate recess formed in a top surface of the collar, wherein the plurality of holes are positioned within the arcuate recess.

26. The improved machining system of claim 17, wherein the bore arcuate ends and the pin body arcuate ends are substantially the same.

27. The improved machining system of claim 26, wherein a length of the bore linear sides is greater than a length of the pin body flats, producing displacement of the pin body within the bore.

\* \* \* \* \*